(12) United States Patent
Shin et al.

(10) Patent No.: US 11,848,437 B2
(45) Date of Patent: Dec. 19, 2023

(54) NEGATIVE ELECTRODE FOR LITHIUM SECONDARY BATTERY, METHOD FOR MANUFACTURING THE SAME, AND LITHIUM SECONDARY BATTERY INCLUDING THE SAME

(71) Applicant: LG CHEM, LTD., Seoul (KR)

(72) Inventors: Sun-Young Shin, Daejeon (KR); Jun-Hyuk Song, Daejeon (KR); Yong-Ju Lee, Daejeon (KR); Je-Young Kim, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 179 days.

(21) Appl. No.: 16/643,782

(22) PCT Filed: Dec. 20, 2018

(86) PCT No.: PCT/KR2018/016385
§ 371 (c)(1),
(2) Date: Mar. 2, 2020

(87) PCT Pub. No.: WO2019/125024
PCT Pub. Date: Jun. 27, 2019

(65) Prior Publication Data
US 2020/0220156 A1    Jul. 9, 2020

(30) Foreign Application Priority Data

Dec. 20, 2017 (KR) .......................... 10-2017-0176323
Dec. 19, 2018 (KR) .......................... 10-2018-0165516

(51) Int. Cl.
*H01M 4/133* (2010.01)
*H01M 4/38* (2006.01)
(Continued)

(52) U.S. Cl.
CPC ............ *H01M 4/133* (2013.01); *H01M 4/134* (2013.01); *H01M 4/366* (2013.01); *H01M 4/386* (2013.01);
(Continued)

(58) Field of Classification Search
None
See application file for complete search history.

(56) References Cited

U.S. PATENT DOCUMENTS

2010/0173198 A1    7/2010  Zhamu et al.
2012/0328956 A1*  12/2012  Oguni .................. B82Y 40/00
                                                         429/232
(Continued)

FOREIGN PATENT DOCUMENTS

CN    106654199 A    5/2017
CN    107039633 A    8/2017
(Continued)

OTHER PUBLICATIONS

Ferrari et al., "Raman Spectrum of Graphene and Graphene Layers", Physical Review Letters, 2006, vol. 97, 187401, total 4 pages.
(Continued)

*Primary Examiner* — Zhongqing Wei
(74) *Attorney, Agent, or Firm* — Birch, Stewart, Kolasch & Birch, LLP

(57) ABSTRACT

A negative electrode including: a negative electrode current collector; and a negative electrode active material layer on at least one surface of the negative electrode current collector. The negative electrode is pre-lithiated and the negative electrode active material layer includes a silicon-based material and a carbonaceous material. In addition, a graphene sheet having 2 layers to 15 layers is on the negative electrode active material layer. The negative electrode is advantageous in terms of storage and safety. A lithium
(Continued)

secondary battery using the negative electrode shows reduced initial irreversibility, and thus provides increased efficiency.

8 Claims, 2 Drawing Sheets

(51) Int. Cl.

| | | |
|---|---|---|
| *H01M 4/66* | (2006.01) | |
| *H01M 4/48* | (2010.01) | |
| *H01M 4/134* | (2010.01) | |
| *H01M 4/587* | (2010.01) | |
| *H01M 10/0525* | (2010.01) | |
| *H01M 4/36* | (2006.01) | |
| *H01M 4/02* | (2006.01) | |

(52) U.S. Cl.
CPC ............. *H01M 4/48* (2013.01); *H01M 4/587* (2013.01); *H01M 4/663* (2013.01); *H01M 10/0525* (2013.01); *H01M 2004/027* (2013.01)

(56) References Cited

U.S. PATENT DOCUMENTS

| | | |
|---|---|---|
| 2013/0309571 A1 | 11/2013 | Yoon et al. |
| 2015/0140434 A1 | 5/2015 | Jung |
| 2015/0325880 A1* | 11/2015 | Kim .................. H01M 10/052 |
| | | 429/338 |
| 2016/0344021 A1 | 11/2016 | Seo et al. |
| 2017/0018761 A1 | 1/2017 | Ogino |
| 2017/0244102 A1 | 8/2017 | Chen et al. |
| 2017/0338480 A1 | 11/2017 | Kim et al. |
| 2017/0365900 A1 | 12/2017 | Khiterer et al. |
| 2018/0342757 A1* | 11/2018 | Choi .................... H01M 4/583 |

FOREIGN PATENT DOCUMENTS

| | | |
|---|---|---|
| JP | 2005-038720 A | 2/2005 |
| JP | 2014-044921 A | 3/2014 |
| JP | 2014-63770 A | 4/2014 |
| JP | 2015-520926 A | 7/2015 |
| JP | 5894313 B2 | 3/2016 |
| JP | 6006789 B2 | 10/2016 |
| KR | 10-2015-0020959 A | 2/2015 |
| KR | 10-2015-0057730 A | 5/2015 |
| KR | 10-1539906 B1 | 7/2015 |
| KR | 10-1580995 B1 | 12/2015 |
| KR | 10-2016-0104491 A | 9/2016 |
| KR | 10-2017-0009739 A | 1/2017 |
| KR | 10-1783447 B1 | 10/2017 |

OTHER PUBLICATIONS

International Search Report for PCT/KR2018/016385 dated Apr. 15, 2019.

* cited by examiner

NEGATIVE ELECTRODE FOR LITHIUM SECONDARY BATTERY, METHOD FOR MANUFACTURING THE SAME, AND LITHIUM SECONDARY BATTERY INCLUDING THE SAME

TECHNICAL FIELD

The present application claims priority to Korean Patent Application No. 10-2017-0176323 filed on Dec. 20, 2017 and Korean Patent Application No. 10-2018-0165516 filed on Dec. 19, 2018 in the Republic of Korea, the disclosures of which are incorporated herein by reference.

The present disclosure relates to a negative electrode for a lithium secondary battery, a method for manufacturing the same, and a lithium secondary battery including the same.

BACKGROUND ART

Recently, since a lithium secondary battery spotlighted as a power source for a portable compact electronic instrument uses an organic electrolyte solution, it shows a discharge voltage at least 2 times higher than the discharge voltage of the conventional battery using an aqueous alkali solution, and thus shows high energy density.

In the case of a lithium secondary battery, there has been a continuous need in the market for increasing energy density. In order to increase energy density, active studies have been conducted about a method for improving the efficiency of a battery by reducing the initial irreversibility through pre-lithiation of lithium at a negative electrode to provide an N/P ratio near 1.

However, in the case of such a pre-lithiated negative electrode, lithium ingredient frequently remains on the surface of a negative electrode active material or the surface of a negative electrode. Thus, it is not easy to store an electrode. In addition, such a negative electrode has a problem related with safety. Therefore, there still has been a need for improvement.

DISCLOSURE

Technical Problem

The present disclosure is designed to solve the problems of the related art, and therefore the present disclosure is directed to providing a negative electrode prevented from reaction between the surface of a pre-lithiated negative electrode or the surface of a negative electrode and water.

The present disclosure is also directed to providing a method for manufacturing the negative electrode.

In addition, the present disclosure is directed to providing a lithium secondary battery including the negative electrode.

Technical Solution

According to the first embodiment of the present disclosure, there is provided a negative electrode including: a negative electrode current collector; a negative electrode active material layer formed on at least one surface of the negative electrode current collector; and a graphene sheet on the negative electrode active material layer, and the graphene sheet comprises 2 layers to 15 layers.

According to the second embodiment of the present disclosure, there is provided the negative electrode as defined in the first embodiment, wherein the graphene sheet comprises 3 layers to 6 layers.

According to the third embodiment of the present disclosure, there is provided the negative electrode as defined in the first or the second embodiment, wherein the graphene sheet includes a plurality of graphene flakes or the graphene sheet is formed by growth on a substrate.

According to the fourth embodiment of the present disclosure, there is provided the negative electrode as defined in any one of the first to the third embodiments, wherein the negative electrode active material layer includes a silicon-based material and a carbonaceous material.

According to the fifth embodiment of the present disclosure, there is provided the negative electrode as defined in any one of the first to the fourth embodiments, wherein the silicon-based material is present in an amount of 30 wt % or more based on the weight of the negative electrode active material present in the negative electrode active material layer.

According to the sixth embodiment of the present disclosure, there is provided the negative electrode as defined in any one of the first to the fifth embodiments, wherein the negative electrode is a pre-lithiated negative electrode.

According to the seventh embodiment of the present disclosure, there is provided the negative electrode as defined in any one of the first to the sixth embodiments, wherein the layers of the graphene sheet are measured by Raman spectroscopy.

According to the eighth embodiment of the present disclosure, there is provided the negative electrode as defined in the fourth embodiment, wherein the silicon-based material is $SiO_x$ wherein $0<x\leq2$; or a silicon oxide-based composite comprising Si and $SiO_2$.

According to the ninth embodiment of the present disclosure, there is provided the negative electrode as defined in the fourth embodiment, wherein the carbonaceous material is at least one of natural graphite, artificial graphite, soft carbon, or hard carbon.

According to the tenth embodiment of the present disclosure, there is provided a lithium secondary battery including the negative electrode as defined in any one of the first to the ninth embodiments.

Advantageous Effects

The negative electrode for a lithium secondary battery according to the present disclosure includes a negative electrode active material provided with a graphene sheet formed thereon, wherein the graphene sheet has 2-15 layers to provide a lithium ion path required for charge/discharge cycles and to inhibit reaction with water. Therefore, a lithium secondary battery using the negative electrode can be prevented from degradation of performance. In addition, the negative electrode for a lithium secondary battery according to the present disclosure is pre-lithiated so that it may show excellent initial efficiency.

In the negative electrode according to an embodiment of the present disclosure, no lithium ingredient remains on the negative electrode surface or negative electrode active material surface. Thus, there is an advantage in that the battery using such a negative electrode can be stored with ease.

In addition, in the lithium secondary battery according to an embodiment of the present disclosure, both the silicon-based material and the carbonaceous material forming the negative electrode active material are lithiated. Thus, it is possible to maximize the initial efficiency of the negative electrode, and thus to increase the capacity and energy density of the battery significantly.

BEST MODE

Hereinafter, preferred embodiments of the present disclosure will be described in detail. However, the description proposed herein is just a preferable example for the purpose of illustrations only, not intended to limit the scope of the disclosure, and the scope of the present disclosure is defined by the following claims.

Figure 1:
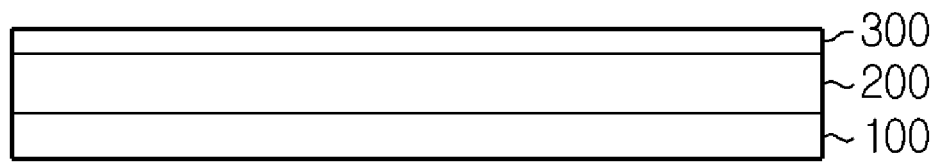
FIG. 1 is a schematic sectional view illustrating the structure of the negative electrode according to an embodiment of the present disclosure.

Referring to FIG. 1, there is provided a negative electrode according to an embodiment of the present disclosure, including: a negative electrode current collector 100; a pre-lithiated negative electrode active material layer 200 formed on at least one of the negative electrode current collector and including a silicon-based material and a carbonaceous material as negative electrode active materials; and a graphene sheet 300 formed on the surface of the pre-lithiated negative electrode active material layer.

According to the present disclosure, the graphene sheet may be formed of a plurality of graphene flakes or a stack of graphene sheets grown on a substrate.

Graphene is a two-dimensional carbonaceous material having $sp^2$ bonds bound to each other to form a honeycomb-like lattice, and has various unique properties, such as high charge transportability, low sheet resistance, mechanical properties and thermal/chemical stability. Such graphene has significantly different utilities depending on its thickness and size.

Since graphene is chemically stable, it can inhibit permeation of water introduced to the negative electrode surface in the vertical direction even when exposed to water. Thus, the graphene sheet including graphene can function as a barrier inhibiting reaction of lithium with water in the active material layer.

Unlike the graphene sheet, when a graphene oxide sheet is stacked on the negative electrode active material layer, electrical conductivity is reduced to cause degradation of the output characteristics of a lithium secondary battery. Moreover, graphene oxide itself has many defects, and thus shows a poor effect of protecting the electrode active material layer from water.

Various methods may be used to determine the thickness of a graphene sheet. According to the present disclosure, the Raman spectroscopy is used to determine the thickness or layer number of graphene sheet.

According to an embodiment of the present disclosure, the graphene sheet may be a few-layer graphene (FLG) having a small number of graphene layers, such as 2-15 layers or 3-6 layers. When the graphene sheet has two or more layers, it is possible to inhibit reaction with water. At the same time, when the graphene sheet has 15 or less layers, it is possible to prevent the problem of blocking of a lithium ion path during charge/discharge cycles. When the lithium ion path is blocked during charge/discharge cycles, the life characteristics of a battery are degraded.

According to the present disclosure, the silicon-based material includes Si. The silicon-based material is not particularly limited, as long as it is a compound used currently in the art. Non-limiting examples of the silicon-based material may include $SiO_x$ (0<x≤2), such as Si and $SiO_2$; or a silicon oxide-based composite ($SiO_x$) including an active phase (Si) in combination with an inactive phase ($SiO_2$).

The silicon-based material may be an amorphous material, a crystalline material or a combination thereof. The silicon-based material may be surface-coated with carbon. When the silicon-based material is coated with carbon, it is possible to inhibit reaction with an electrolyte solution, to improve conductivity and to inhibit swelling of Si. The carbon coating may be present in an amount of 1-20 wt % based on the total weight of the composition forming the negative electrode active material layer.

In addition to the silicon-based negative electrode active material, the negative electrode active material layer may further include a carbonaceous material as a negative electrode active material. For example, the carbonaceous material may be natural graphite, artificial graphite, soft carbon, hard carbon or a combination thereof, preferably graphite, such as natural graphite or artificial graphite.

The silicon-based material may be present in an amount of 30 wt % or more, 35 wt % or more, or 40 wt % or more, based on the weight of the negative electrode active material. When the content of the silicon-based material is within the above-defined range, the initial efficiency is low so that the pre-lithiation of the negative electrode has a significant effect and the binding force with the graphene sheet may be increased. It is possible to control the capacity per weight by blending the silicon-based material with the carbonaceous material.

The negative electrode active material layer may further include a binder polymer, a conductive material and other additives, in addition to the negative electrode active materials.

The binder polymer may be an aqueous binder polymer, and particular examples thereof may include styrene-butadiene rubber (SBR), carboxymethyl cellulose (CMC), acrylonitrile-butadiene rubber, acrylic resin, hydroxyethyl cellulose, or a combination thereof. The aqueous binder polymer may be used in an amount of 1-30 wt %, preferably 1-10 wt %, based on the total weight of the solid content in the negative electrode active material layer.

The conductive material is used for imparting conductivity to an electrode. The conductive material is not particularly limited, as long as it is an electron conductive material while not causing any chemical change in the corresponding battery. Particular examples of the conductive material may include natural graphite, artificial graphite, carbon black, acetylene black, Ketjen black, carbon fibers, metal powder such as copper, nickel, aluminum or silver, metal fibers, or the like. A conductive material, such as a polyphenylene derivative, may be used in combination.

As a negative electrode current collector, copper foil, nickel foil, stainless steel foil, titanium foil, nickel foam, copper foam, a polymer substrate coated with a conductive metal or a combination thereof may be used.

Methods for pre-lithiation of the negative electrode may include, but are not limited to: a method including dipping a roll on which the negative electrode and copper (Cu) foil with metal lithium (Li) pressed on both surfaces thereof are wound together into an electrolyte solution to perform pre-lithiation of the negative electrode surface; a method including heat treating lithium (Li) metal in a vacuum (about 10 torr) state to perform direct deposition of gaseous lithium on the negative electrode; a method including applying a dispersion of particles containing an excessive amount of lithium (e.g. Stabilized Lithium Metal Powder (SLMP®)) in a binder polymer to a negative electrode and passing the negative electrode through a roll press to perform lithiation of the negative electrode; and contacting a negative electrode with a lithium-containing positive electrode and causing lithium (Li) to be packed in the negative electrode through an electrochemical process while allowing flow of electric current at a low current level.

When the negative electrode active material layer is subjected to pre-lithiation as mentioned above, most lithium is inserted into the carbonaceous material, such as graphite, or forms an alloy with the silicon-based material, but a part of lithium ingredient remains on the active material layer surface, i.e. on the negative electrode surface and reacts with water sensitively to cause degradation of the battery performance or degradation of safety. Thus, according to the present disclosure, a graphene sheet is formed on the outermost layer of the electrode after pre-lithiation to prevent reaction of the negative electrode active material layer with water. In this manner, it is possible to prevent degradation of the battery performance.

According to an embodiment of the present disclosure, the method for coating with graphene is not particularly limited. Non-limiting examples of the method include, but are not limited to: 1-1) a method including dispersing graphene in a dispersion medium and applying the dispersion to the electrode, followed by drying; 1-2) dispersing graphene in a dispersion medium and dipping the electrode in the dispersion, followed by drying; 2) coating the negative electrode directly with graphene by using low-temperature plasma chemical vapor deposition (CVD); 3) growing graphene on metal foil through CVD and transferring graphene onto the negative electrode by using a support, such as poly(methyl methacrylate (PMMA); 4) growing graphene on a wafer and transferring the graphene onto the negative electrode active material layer; or the like.

When the graphene sheet is formed by growing graphene on a substrate, graphene is grown to a high extent in a layer by layer scale. Thus, there is an advantage in that graphene may be provided with a small thickness.

In the method as mentioned in 4), a SiC wafer may be used as a substrate, wherein the SiC wafer may be heat treated at high temperature to grow graphene. Then, a thermal release tape is attached to graphene and pressure is applied thereto so that graphene may be transferred to the thermal release tape. After that, the heat release tape after the transfer is attached onto the negative electrode, and then low pressure is applied thereto and heat treatment is carried out to lower the adhesion of the thermal release tape so that graphene may be transferred. However, the scope of the present disclosure is not limited thereto.

In addition, in the method as mentioned in 4), the SiC wafer may be heat treated at a temperature of 1100-2000° C. for 0.5-10 hours, or at a temperature of 1200-1900° C. for 1-5 hours. When the SiC wafer is heat treated at a temperature for a time within the above-defined ranges, it is possible to obtain a graphene sheet having a desired number of layers. In addition, to lower the adhesion of the thermal release tape, heat treatment may be carried out at a temperature of 100-150° C., for example, at a temperature of 120° C.

Then, the negative electrode having the graphene sheet formed thereon is dried in a dry room at a temperature of 80-130° C. for 5 hours to 1 day to reduce the water content in the negative electrode to the highest degree. The water content after drying may be determined by using a system available from a Carl Fischer.

The negative electrode forms an electrode assembly together with a positive electrode including a positive electrode active material and a separator, and the electrode assembly and an electrolyte solution are received in a casing to provide a lithium secondary battery.

The positive electrode active material may be a layered compound such as lithium cobalt oxide ($LiCoO_2$) or lithium nickel oxide ($LiNiO_2$), or a compound substituted with one or more transition metals; a lithium manganese oxide represented by the chemical formula of $Li_{1+x}Mn_{2-y}O_4$ (wherein y is 0-0.33), $LiMnO_3$, $LiMn_2O_3$ or $LiMnO_2$; a lithium copper oxide ($Li_2CuO_2$); a vanadium oxide such as $LiV_3O_8$, $LiFe_3O_4$, $V_2O_5$ or $Cu_2V_2O_7$; a Ni-site type lithium nickel oxide represented by the chemical formula of $LiNi_{1-y}M_yO_2$ (wherein M is Co, Mn, Al, Cu, Fe, Mg, B or Ga, and y is 0.01-0.3); a ternary lithium manganese composite oxide represented by the chemical formula of $LiMn_{2-y}M_yO_2$ (wherein M=Co, Ni, Fe, Cr, Zn or Ta, and y is 0.01-0.1) or $Li_2Mn_3MO_8$ (wherein M=Fe, Co, Ni, Cu or Zn); $LiMn_2O_4$ in which Li is partially substituted with an alkaline earth metal ion; a disulfide compound; $Fe_2(MoO_4)_3$; ternary lithium transition metal composite oxide represented by the chemical formula of $Li(Ni_aCo_bMn_c)O_2$ ($0<a<1$, $0<b<1$, $0<c<1$, $a+b+c=1$); or the like, or its combination, but is not limited thereto.

The positive electrode active material may be dispersed in an organic solvent together with a binder polymer, conductive material and other additives to form positive electrode mixture slurry, and the slurry may be coated onto at least one surface of a positive electrode current collector, followed by drying and pressing, to form a positive electrode.

The binder polymer used for the positive electrode functions to attach the positive electrode active material particles sufficiently with each other and to attach the positive electrode active material to a current collector. Typical examples of the binder polymer may include, but are not limited to: polyvinylidene fluoride, polyvinylidene fluoride-co-hexafluoropropylene, polyvinyl alcohol, carboxymethyl cellulose, hydroxypropyl cellulose, diacetyl cellulose, polyvinyl chloride, carboxylated polyvinyl chloride, polyvinyl fluoride, ethylene oxide-containing polymer, polyvinyl pyrrolidone, polyurethane, polytetrafluoroethylene, polyethylene, polypropylene, styrene-butadiene rubber, acrylated styrene-butadiene rubber, epoxy resin, or the like.

The conductive material used for the positive electrode may be the same as or different from the conductive material used for the negative electrode. See, the above description with reference to the negative electrode.

Non-limiting examples of the positive electrode current collector include foil made of aluminum, nickel or a combination thereof, and those of the negative electrode current collector include foil made of copper, gold, nickel, copper alloy or a combination thereof.

The electrolyte solution includes conventional electrolyte solution ingredients, such as an electrolyte salt and an organic solvent. The electrolyte salt that may be used is a salt having a structure of $A^+B^-$, wherein $A^+$ includes an alkali metal cation such as $Li^+$, $Na^+$, $K^+$ or a combination thereof and $B^-$ includes an anion such as $PF_6^-$, $BF_4^-$, $Cl^-$, $Br^-$, $I^-$, $ClO_4^-$, $AsF_6^-$, $CH_3CO_2^-$, $CF_3SO_3^-$, $N(CF_3SO_2)_2^-$, $C(CF_2SO_2)_3^-$ or a combination thereof. Particularly, a lithium salt is preferred. For example, LiClO$_4$, LiCF$_3$SO$_3$, LiPF$_6$, LiAsF$_6$, LiN(CF$_3$SO$_2$)$_2$ or a combination thereof may be used.

The organic solvent used in combination with the electrolyte solution may include a currently known solvent, such as a cyclic carbonate solvent; liner carbonate solvent; ester solvent; nitrile solvent; phosphate solvent; or a combination thereof, wherein the solvent may include a halogen substituent or not. For example, the organic solvent that may be used includes propylene carbonate (PC), ethylene carbonate (EC), diethyl carbonate (DEC), dimethyl carbonate (DMC), dipropyl carbonate (DPC), dimethyl sulfoxide, acetonitrile, dimethoxyethane, diethoxyethane, tetrahydrofuran, N-methyl-2-pyrrolidone (NMP), ethyl methyl carbonate (EMC), gamma-butyrolactone (GBL), fluoroethylene carbonate (FEC), methyl formate, ethyl formate, propyl formate, methyl acetate, ethyl acetate, propyl acetate, pentyl acetate, methyl propionate, ethyl propionate, propyl propionate, butyl propionate or a combination thereof.

The lithium secondary battery according to an embodiment of the present disclosure may be provided in the form of a cylindrical, prismatic, pouch-type or coin-type battery, but its outer shape or casing is not limited thereto.

The lithium secondary battery according to an embodiment of the present disclosure may include any conventional lithium secondary batteries, such as a lithium metal secondary battery, lithium ion secondary battery, lithium polymer secondary battery or a lithium ion polymer secondary battery.

MODE FOR DISCLOSURE

Examples will be described more fully hereinafter so that the present disclosure can be understood with ease. The following examples may, however, be embodied in many different forms and should not be construed as limited to the exemplary embodiments set forth therein. Rather, these exemplary embodiments are provided so that the present disclosure will be thorough and complete, and will fully convey the scope of the present disclosure to those skilled in the art.

Example 1: Negative Electrode Including Graphene Sheet Having 3 Layers

Process for Manufacturing Negative Electrode:
First, 50% SiO was mixed with 50% artificial graphite to provide a negative electrode active material. Next, Super-C65 (conductive material) and carboxymethyl cellulose (CMC)/styrene-butadiene rubber (SBR) were prepared so that the weight ratio of the negative electrode active material:Super-C65:CMC:SBR=92:2:2:4 to obtain negative electrode slurry. Then, the slurry was coated on copper foil having a thickness of 20 m and dried at 60° C. Then, pressing was carried out to an electrode density of 1.3 g/cc.

Process for Pre-Lithiation of Negative Electrode
The negative electrode obtained as described above was cut into a size of 5 cm×5 cm and dipped in an electrolyte solution (1M LiPF$_6$, ethylene carbonate (EC)/ethyl methyl carbonate (EMC)/dimethyl carbonate (DMC)=1:1:1, weight ratio) for 1 day so that it might be wetted sufficiently. Then, metal lithium was allowed to be in contact with the negative electrode active material layer, a weight of 2 kg was loaded thereon, and the resultant structure was allowed to stand for 40 minutes. After that, the resultant structure was dried in a vacuum oven at 130° C. for 8 hours.

Synthesis of Graphene Sheet and Transfer Process to Negative Electrode

A SiC wafer (CREE Research, Inc., 6H-SiC (0001) wafer) was heat treated at 1300° C. for 1 hour to form a graphene sheet. It was observed that the graphene sheet had a thickness corresponding to 3 layers. This was determined by the Raman spectroscopy known to those skilled in the art. A thermal release tap was attached to the graphene sheet formed on SiC and pressure was applied thereto to transfer the graphene sheet onto the thermal release tape. The thermal release tape to which the graphene sheet was transferred was attached onto the pre-lithiated negative electrode active material layer, low pressure was applied thereto and heat treatment was carried out at 120° C. to reduce the adhesion of the tape. In this manner, the graphene sheet was transferred onto the negative electrode active material layer.

Example 2: Negative Electrode Including Graphene Sheet Having 5 or 6 Layers

A graphene sheet was formed in the same manner as Example 1, except that the SiC wafer was heat treated at a temperature of 1400° C. for 2 hours. Herein, it was determined that the graphene sheet had a thickness corresponding to about 5 or 6 layers. Then, the graphene sheet was transferred onto the pre-lithiated negative electrode active material layer in the same manner as Example 1.

Comparative Example 1: Negative Electrode Including No Graphene Sheet

A negative electrode was obtained in the same manner as Example 1, except that the graphene sheet was not prepared and the step of transferring the graphene sheet to the negative electrode was not carried out.

Comparative Example 2: Negative Electrode Having Monolayer of Graphene Sheet

A graphene sheet was formed in the same manner as Example 1, except that the SiC wafer was heat treated at 1200° C. for 1 hour. Herein, it was determined that a monolayer of graphene sheet was formed. Then, the graphene sheet was transferred onto the pre-lithiated negative electrode active material layer in the same manner as Example 1.

Comparative Example 3: Negative Electrode Including Graphene Sheet Having 20 or More Layers A graphene sheet was formed in the same manner as Example 1, except that the SiC wafer was heat treated at 1900° C. for 4 hours. Herein, the graphene sheet shows substantially the same shape of graphite. Thus, it was thought that the thickness of graphene sheet was 20 or more layers. Then, the graphene sheet was transferred onto the pre-lithiated negative electrode active material layer in the same manner as Example 1.

Determination of Water Content
In a dry room, each of the electrodes according to Examples and Comparative Examples was stored for 15 days. Then, each electrode was determined for its water content by using a Karl Fischer water content measuring system. The results are shown in the following Table 1.

TABLE 1

| | Water content (ppm) |
|---|---|
| Example 1 | 335 ppm |
| Example 2 | 286 ppm |
| Comparative Example 1 | 1024 ppm |
| Comparative Example 2 | 729 ppm |
| Comparative Example 3 | 290 ppm |

It can be seen from Table 1 that each of the negative electrodes according to Examples 1 and 2 shows a significantly lower water content as compared with the negative electrodes according to Comparative Examples 1 and 2.

Comparison of Life Characteristics of Coin Full Cells

Figure 2:
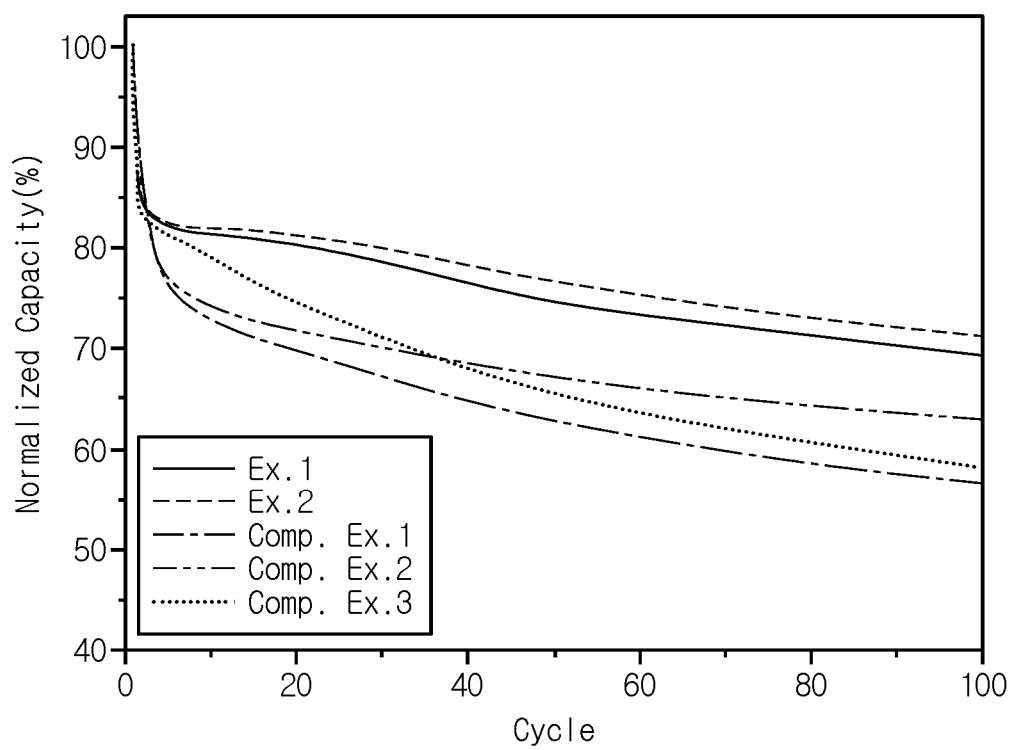
FIG. 2 is a graph illustrating the life characteristics of Example 1 and Comparative Example 1.

Each of the negative electrodes according to Examples 1 and 2 and Comparative Examples 1-3, a positive electrode using $LiCoO_2$ as a positive electrode active material, an electrolyte solution containing 0.5 wt % of vinylene carbonate (VC) and $LiPF_6$ electrolyte salt added to an organic solvent containing ethylene carbonate (EC)/ethyl methyl carbonate (EMC) at a weight ratio of 3/7, and a polypropylene (PP) separator were used to manufacture a coin full cell. The resultant coin full cells were subjected to first cycle of charge/discharge at 0.1C, and then to charge/discharge for 9 cycles at 0.5C. Then, the coin full cells were compared with each other in terms of life characteristics. The results are shown in FIG. 2. Herein, charge was carried out in a constant current (CC)/constant voltage (CV) mode, and discharge was carried out in a CC mode to 3.0-4.3V.

It can be seen from FIG. 2 illustrating the graph of each coin full cell according to Examples 1 and 2 that when a graphene sheet having an adequate thickness is present on the negative electrode active material layer, the coin full cell shows a small decrease in capacity even when repeating charge/discharge cycles, thereby providing excellent life characteristics. However, when no graphene sheet is present or a thin graphene sheet is present like in the case of Comparative Examples 1 and 2, it is difficult to prevent reaction between the negative electrode active material and water, resulting in a graph illustrating degradation of life characteristics. In addition, when a thick graphene sheet is formed like in the case of Comparative Example 3, it is possible to inhibit reaction between the negative electrode active material and water but such a thick graphene sheet blocks a lithium ion path during charge/discharge to cause degradation of life characteristics of the coin full cell.

Determination of Number of Layers in Graphene Sheet

The number of layers in a graphene sheet was determined based on the shape of peaks of a 2D band graph obtained through the Raman spectroscopy. As the number of graphene sheets is increased, the graph becomes the graph of graphite. See, [Ferrari, A. C. et al., Raman spectrum of graphene and graphene layers, Phys. Rev. Lett. 97, 187401, (2006), Journal of the Korean Physical Society 55, 1299-1303 (2009)] about detailed description of method for determination of graphene layers and analysis thereof.

Figure 3:
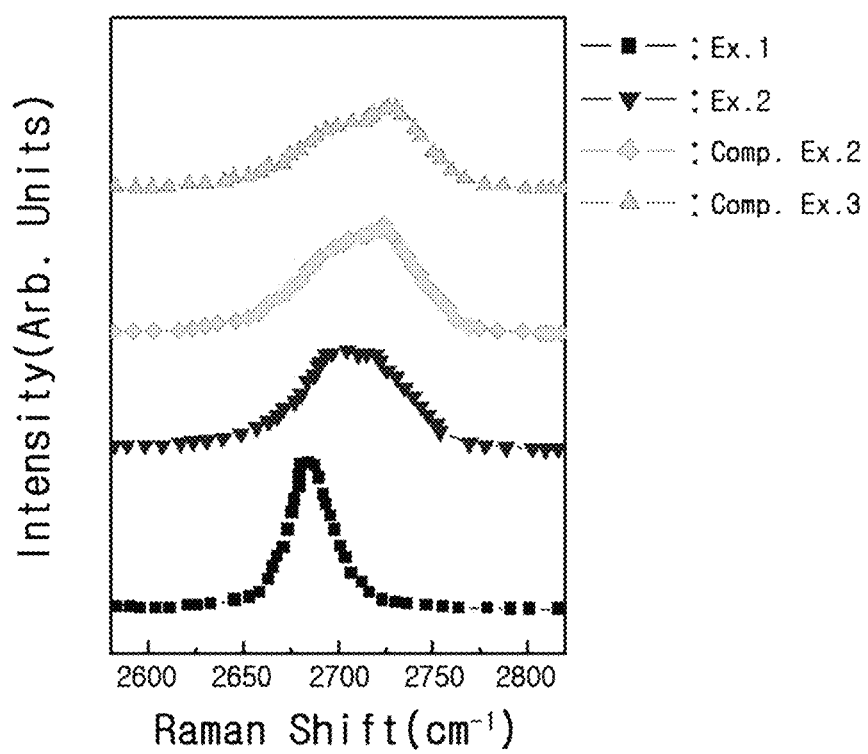
FIG. 3 is a graph illustrating the results of the Raman spectroscopy for each of the negative electrode active materials according to Examples 1 and 2 and Comparative Examples 2 and 3.

FIG. 3 shows the graphs obtained from the Raman spectroscopy of each of the graphene sheets according to Examples 1 and 2 and Comparative Examples 2 and 3. Referring to FIG. 3, the graphene band has a peak at around 2670-2770 $cm^{-1}$. Since the graph of the graphene sheet according to Example 1 is broader than the graph of the graphene sheet according to Comparative Example 3, it can be seen that the graph of the graphene sheet according to Example 3 is similar to that of graphite.

What is claimed is:

1. A negative electrode comprising:
   a negative electrode current collector;
   a negative electrode active material layer on at least one surface of the negative electrode current collector; and
   a graphene sheet on the negative electrode active material layer, wherein the graphene sheet comprises 3 layers to 6 layers,
   wherein the negative electrode active material layer comprises a material consisting of artificial graphite and $SiO_x$, wherein 0<x<2, and
   wherein the $SiO_x$, wherein 0<x<2, is present in an amount of 30 wt % or more based on a weight of negative electrode active material present in the negative electrode active material layer.

2. The negative electrode according to claim 1, wherein the graphene sheet comprises a plurality of graphene flakes or the graphene sheet is formed by growth on a substrate.

3. The negative electrode according to claim 1, wherein the negative electrode is a pre-lithiated negative electrode.

4. The negative electrode according to claim 1, wherein the number of layers of the graphene sheet are measured by Raman spectroscopy.

5. A lithium secondary battery comprising the negative electrode as defined in claim 1.

6. The negative electrode according to claim 1, wherein the graphene sheet is not a graphene oxide sheet.

7. The negative electrode according to claim 1, wherein the graphene sheet is formed by heat treating a SiC wafer at a temperature ranging from 1200° C. to 1900° C. for a time ranging from 1 hour to 5 hours.

8. The negative electrode according to claim 1, wherein the negative electrode active material layer comprises a material consisting of artificial graphite and SiO.

* * * * *